Dec. 6, 1932.  C. F. LANE  1,890,391
RODENT FEEDER
Filed Dec. 7, 1931
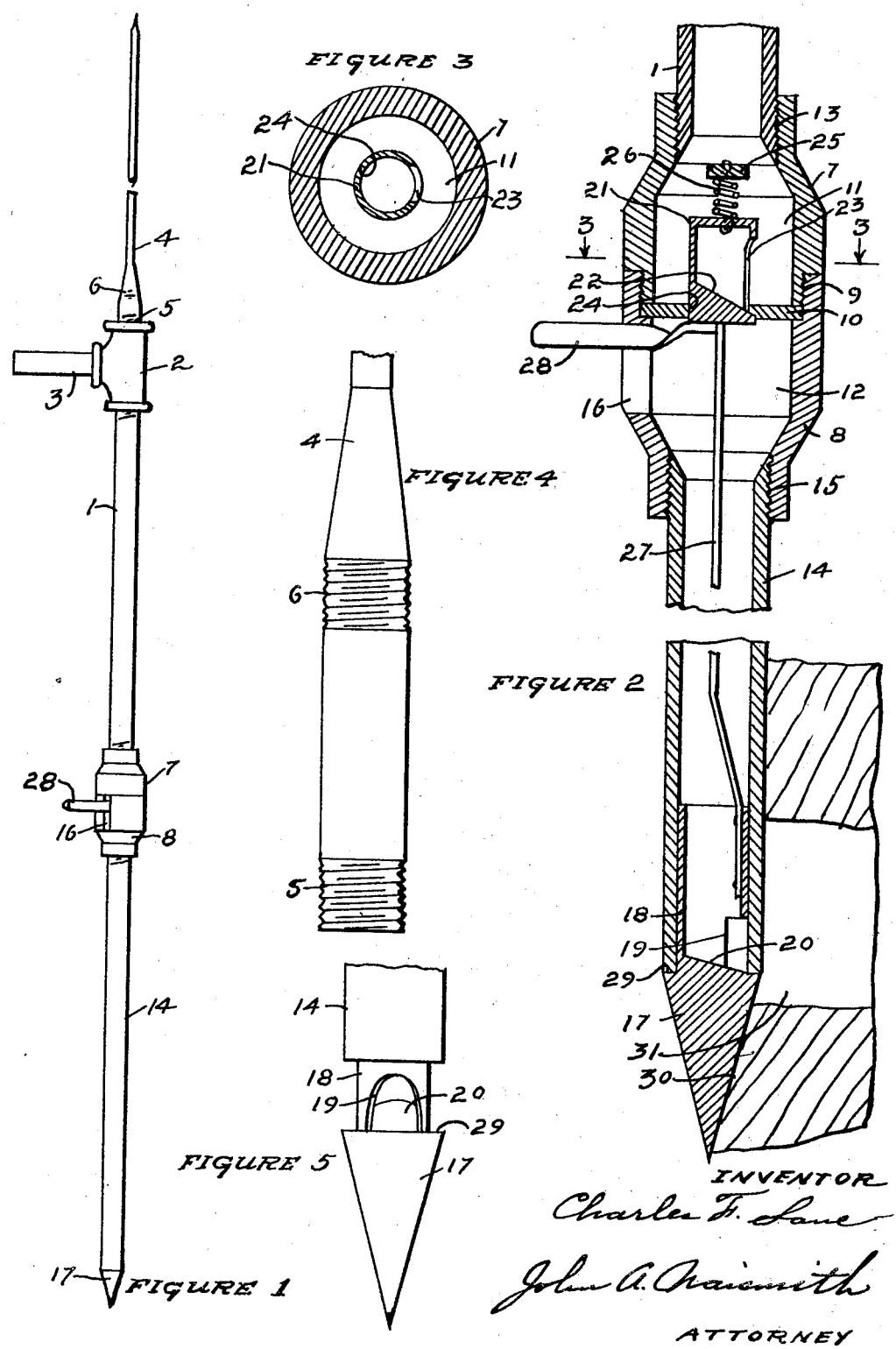

Patented Dec. 6, 1932

1,890,391

UNITED STATES PATENT OFFICE

CHARLES F. LANE, OF SAN JOSE, CALIFORNIA

RODENT FEEDER

Application filed December 7, 1931. Serial No. 579,362.

The present invention relates particularly to a device by means of which poisoned food may be deposited in the underground gallery of a burrowing rodent without materially disturbing the soil over the same.

It is one object of the invention to provide a device of the character indicated whereby the exact location of the rodent's burrow may be quickly and easily determined, and whereby poisoned food may be quickly and easily deposited within the burrow without the necessity of digging away any of the soil.

It is also an object of the invention to provide a device of the character indicated that will be economical to manufacture, simple in form and construction, of few parts, quickly and easily assembled, strong, durable, and highly efficient in its practical application, and one that will accurately and positively measure the food deposited from a given supply.

In the drawing:

Figure 1 is a side elevation of a device embodying my invention, part broken away.

Figure 2 is an enlarged section on line 2—2 of Figure 1, parts broken away.

Figure 3 is a section on line 3—3, Figure 2.

Figure 4 is an enlarged elevation of a portion of the finder spear.

Figure 5 is an enlarged elevation of the discharge end of the device when open.

In the embodiment of the device as herein shown, I show at 1 a tube upon which is mounted a fitting 2 to carry a handle 3. Into the top of the hollow fitting 2 is threaded a pointed rod 4 as at 5, the rod being also threaded as at 6 to permit its being sheathed and secured when not in use.

At 7 and 8 are two portions of a hollow coupling screwed together as at 9 with a plate 10 mounted therebetween to form two chambers as 11 and 12. The upper portion 7 is threaded upon the lower end of the tube 1 as at 13, and the lower portion 8 has a tube 14 threaded into its lower end as at 15. The part 8 has a slot 16 formed therein as shown.

At 17 is a cone shaped member fitted with a tubular part 18 mounted to slide in tube 14 and provided with a discharge opening 19 at its base, the bottom of the tubular part 18 sloping toward the discharge opening 19 as at 20.

At 21 is shown a measuring cup having a bottom 22 sloping toward a discharge opening 23 in the side of the cup, the cup being cylindrical in form and being slidably mounted in passage 24 in plate 10. The cup is connected to a cross-bar 25 on part 7 by means of a spring 26, and is connected to the part 17—18 by means of a rod 27. An operating bar 28 passes through slot 16 and is mounted on cup 21. The spring 26 normally supports the cup 21 in chamber 11 where it will automatically fill with grain from the chamber, and at the same time holds the shoulder 29 on member 17 against the lower end of tube 14 and consequently closes opening 19.

In using the device the chamber 11 and tube 1 are filled with poisoned grain and the spear 4 placed in position as shown in Figure 1. Selecting a place where the ground shows indications of a rodent having burrowed therethrough, the spear 4 is thrust into the soil and the depth of the burrow ascertained. This can be readily determined with a spear of small diameter since the soil offers but slight resistance, and the entrance of the spear point into an open space is readily noted. The device is now inverted and the part 17—14 is thrust into the ground until its point passes through the burrow and into the soil again as shown at 30, the burrow showing at 31. By placing a foot on bar 28 and gripping handle 3 parts 17 and 21 may be moved relative to part 1 and attached members, thereby carrying the contents of cup 21 from chamber 11 to chamber 12 where it is discharged downwardly through opening 19 and into the burrow.

By means of this device operated as described a measured portion of poisoned food may be deposited in a burrow quickly and positively and without materially disturbing the soil forming its enclosing walls.

It is to be understood, of course, that while I have herein shown and described but one specific embodiment of the invention, changes in form, construction, and method of assembly and operation may be made within the scope of the appended claims.

I claim:

1. A device of the character described comprising, a tubular member adapted to penetrate the soil to a rodent's burrow and having a magazine chamber formed therein and a discharge chamber formed therein, means for transferring a measured portion of material from the magazine chamber to the discharge chamber, and separate means cooperating as a unit with the last mentioned means for discharging the measured portion of material from the discharge chamber into the burrow.

2. A device of the character described comprising, a tubular member adapted to penetrate the soil to a rodent's burrow and having a housing mounted upon its upper end, the said housing having a handle mounted thereon and having a partition disposed therein to divide the same into two chambers, the said partition having an axially disposed hole formed therein, a measuring cup slidably mounted in said hole and having an opening formed in one side thereof, an operating bar mounted on the cup in the lower chamber and extending through the chamber wall, resilient means for normally supporting the cup in the upper chamber, a closure for the bottom end of the tubular member having a tubular portion slidably engaging the said tubular member and having an opening formed in the side thereof normally closed by said tubular member, and a connecting member between the said cup and closure whereby moving the cup into the lower chamber will slide the said closure to uncover the opening in the side thereof.

CHARLES F. LANE.